United States Patent [19]

Younce

[11] Patent Number: 5,777,843
[45] Date of Patent: Jul. 7, 1998

[54] POWER DISTRIBUTION BOX AND HOUSING ASSEMBLY

[75] Inventor: Thomas Matthew Younce, Livonia, Mich.

[73] Assignee: Yazaki Corporation, Tokyo, Japan

[21] Appl. No.: 678,812

[22] Filed: Jul. 12, 1996

[51] Int. Cl.[6] ................................................ H02B 1/26
[52] U.S. Cl. ........................ 361/641; 361/679; 429/76.2
[58] Field of Search ............................. 361/610, 622,
361/626, 637–642, 646, 648–650, 679,
728, 822–824, 826, 833–834, 837; 439/76.2

[56] References Cited

U.S. PATENT DOCUMENTS

| | | | |
|---|---|---|---|
| 2,968,689 | 1/1961 | Johnson | 361/641 |
| 4,689,718 | 8/1987 | Maue et al. | 361/360 |
| 4,747,791 | 5/1988 | Nishio | 439/638 |
| 4,954,102 | 9/1990 | Ozaki et al. | 439/535 |
| 4,956,748 | 9/1990 | Yamamoto et al. | 361/394 |
| 4,959,018 | 9/1990 | Yamamoto et al. | 439/76 |
| 5,207,587 | 5/1993 | Hamill et al. | 439/76.2 |
| 5,253,143 | 10/1993 | Klinger et al. | 361/679 |
| 5,295,842 | 3/1994 | Ozaki et al. | 439/76.2 |
| 5,406,452 | 4/1995 | Uchiumi | 361/610 |
| 5,478,244 | 12/1995 | Maue et al. | 439/76.2 |

FOREIGN PATENT DOCUMENTS 6390920   6/1988   Japan.

Primary Examiner—Gregory D. Thompson
Attorney, Agent, or Firm—Young & Basile, P.C.

[57] ABSTRACT

A double-sided power distribution box and protective housing assembly provides convenient access to both sides of the power distribution box for servicing and inspection, while still protecting both sides of the power distribution box from contamination by solid or liquid materials. A lower housing is fixedly mounted to some structure and is connected to the power distribution box by a hinge. The power distribution box is pivotable about the hinge between a closed position wherein the power distribution box nests into the concave upper side of the lower housing so that the power distribution box lower surface is enclosed by the lower housing, and an open position wherein the power distribution box lower surface is exposed for servicing or inspection. An upper housing is also connected to the power distribution box by a hinge and openable to allow access to the electrical components on the upper surface of the power distribution box. The lower housing also provides a compartment which allows protected, interior mounting of supplemental electrical components such as an electronic module, an in-line connection or a splice box.

10 Claims, 3 Drawing Sheets

POWER DISTRIBUTION BOX AND HOUSING ASSEMBLY

FIELD OF THE INVENTION

This invention relates in general to power distribution boxes (PDBs) such as those used in automotive vehicle electrical systems, and more specifically to a double-sided PDB and housing assembly which provides complete and easy access to electrical components on both sides of the PDB when mounted in an engine compartment.

BACKGROUND OF THE INVENTION

Power distribution boxes (PDBs) are commonly used in automotive vehicles to simplify electrical system wiring by eliminating multi-branch wiring and consolidating fuses, relays and other electrical components in a single location. A PDB typically comprises a case containing one or more bus bar circuit boards and having external receptacles into which wire harness connectors, fuses, relays and other components are plugged. Some PDBs have receptacles formed on only one surface of the case while others, referred to herein as "double-sided" PDBs, have receptacles formed on opposite, parallel surfaces of the case to create a more compact package.

PDBs are often located inside the engine compartment of a vehicle. Since a PDB must be readily accessible for inspection and servicing, it should ideally be positioned near the top of the engine compartment with all of the replaceable components oriented upward. But the number and complexity of vehicle electrical systems have increased in recent years, with the result that PDBs have grown larger in size and become more difficult to locate in the limited space available within an engine compartment while still providing adequate access to the PDB. A single-sided PDB with the requisite number of electrical components may be too large to fit into the allotted space. A double-sided PDB may fit better into the available space, but it is then difficult to access the receptacles on both sides of the PDB.

PDBs mounted in the engine compartment must be protected against contamination such as water or dirt. It is common to provide a cover which is removably attached to the PDB.

SUMMARY OF THE INVENTION

It is an object of this invention to provide a means for mounting a double-sided PDB and a protective housing in a vehicle engine compartment in such a manner as to provide convenient access to both sides of the PDB for servicing and inspection, while still protecting both sides of the PDB from contamination by solid or liquid materials.

A further object of this invention is to provide a PDB housing which allows protected, interior mounting of supplemental electrical components such as an electronic module, an in-line connection or a splice box.

A further object of this invention is to provide a housing for a double-sided PDB that effectively seals and protects both sides of the PDB from contamination by solid or liquid materials while the PDB is in use.

These objects are achieved by the provision of a PDB and housing assembly wherein a double-sided PDB is fitted with an upper housing which encloses an upper surface of the PDB and a lower housing which encloses a lower surface of the PDB, the lower housing being connected to the PDB by hinge means. When installed in the engine compartment, the lower housing is mounted to some fixed structure therein and the PDB is movable about the hinge means between a closed position and an open position. In the closed position the PDB nests into the concave upper side of the lower housing so that the PDB lower surface is enclosed by the lower housing and protected from contaminants, and in the open position the PDB is pivoted upwardly with respect to the lower housing to expose the PDB lower surface. The upper housing is also connected to the PDB by hinge means and is openable to allow access to the electrical components on the upper surface of the PDB.

In the illustrative embodiment of the invention, the hinge means connecting the PDB and the lower housing comprises a pair of hinge plates projecting upwardly from opposite sides of the lower housing, each hinge plate having an elongated slot formed therein to receive a post projecting from the PDB. This hinge configuration permits the PDB to be lifted away from the lower housing and then pivoted to permit access to the PDB lower surface. This movement of the PDB also allows access to a compartment located within the lower housing beneath the PDB, the compartment providing a sealed, protected location for supplemental electrical components.

To keep the electrical components connected to the PDB lower surface from becoming inadvertently dislodged, a retainer plate is provided which attaches to the PDB and overlays those components. In the preferred embodiment, the retainer plate is connected to the PDB by hinges, and is pivotable away from its overlaying position after the PDB has been moved to the access position.

DETAILED DESCRIPTION OF THE PREFERRED EMBODIMENT

Figure 1:
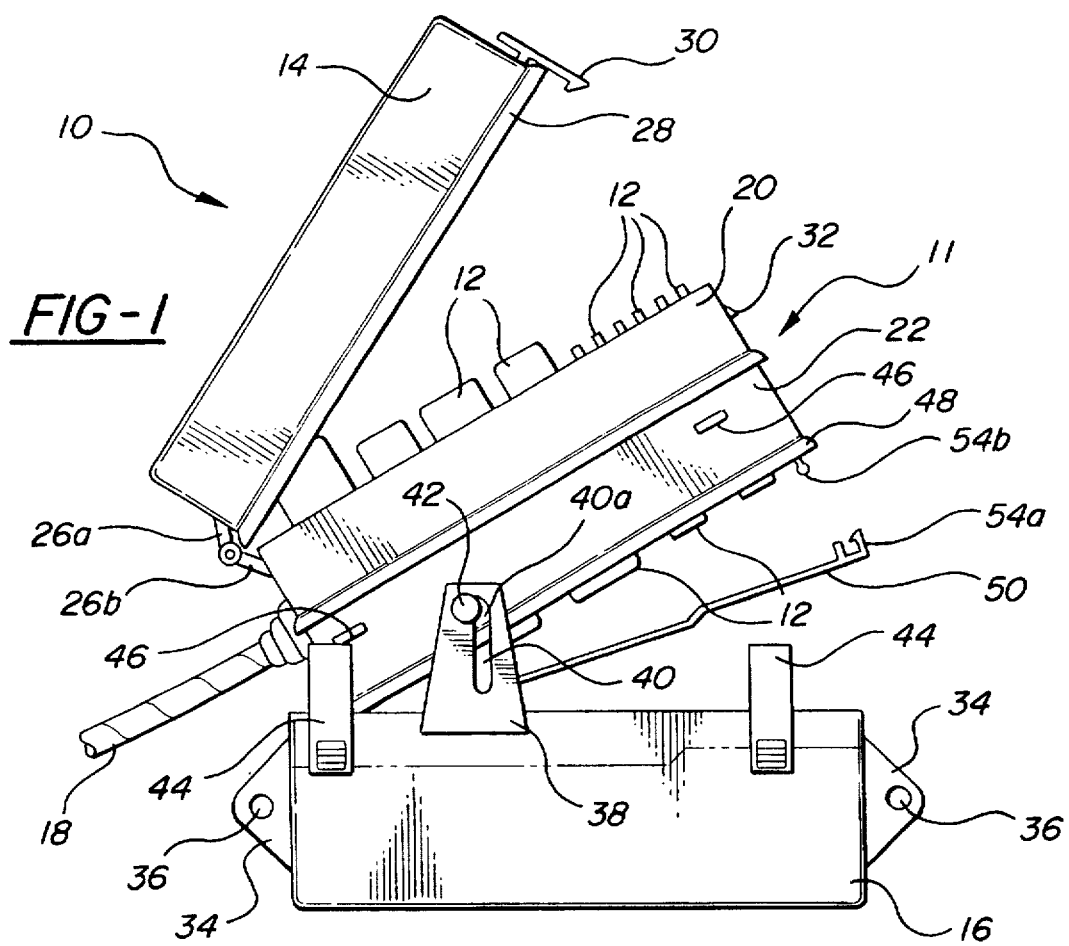
FIG. 1 is an elevation view of the invention power distribution box (PDB) and housing assembly with both the upper and lower housings in open positions.
Figure 2:
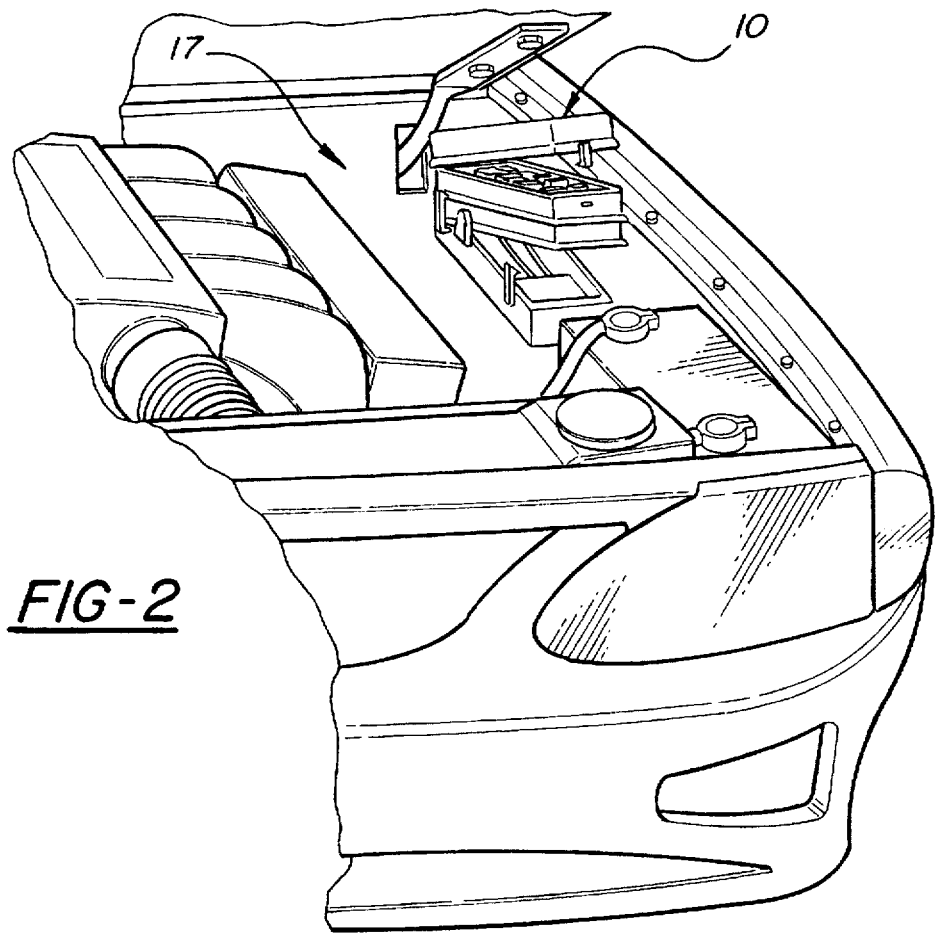
FIG. 2 is a perspective view of the invention PDB and housing assembly operatively installed in a vehicle engine compartment.
Figure 3:
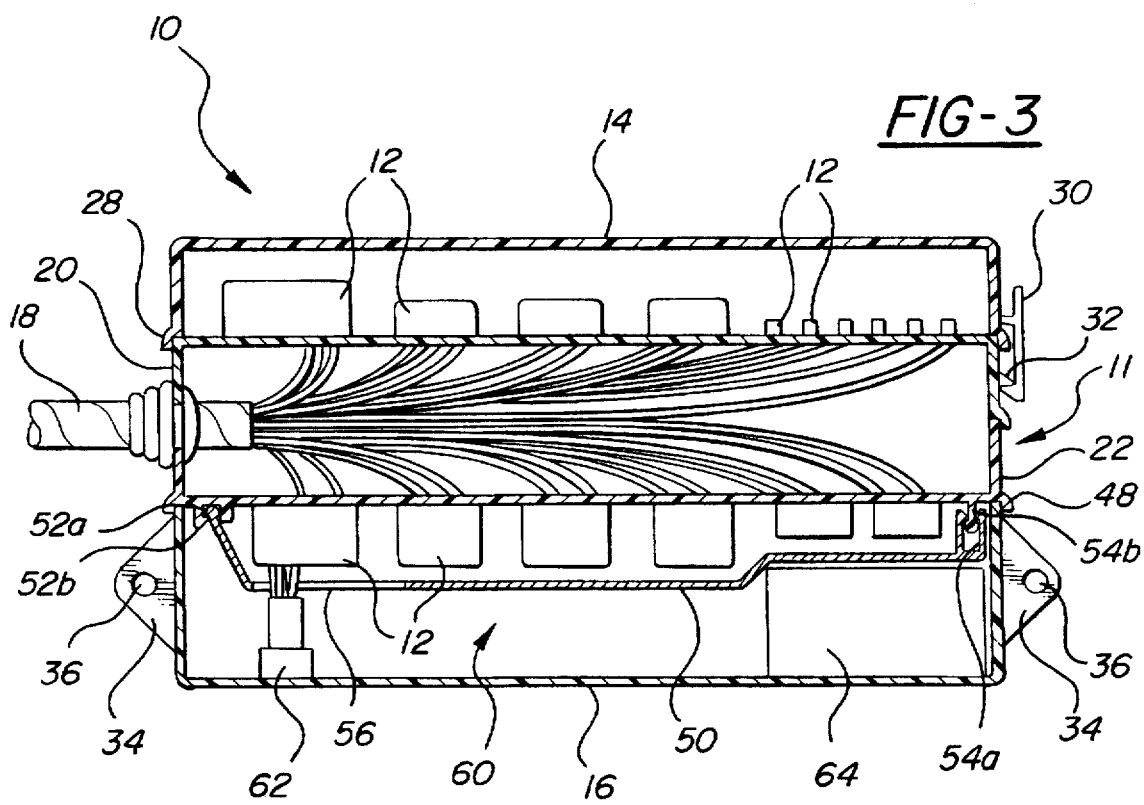
FIG. 3 is a cross-sectional view of the invention PDB and housing assembly.
Figure 4:
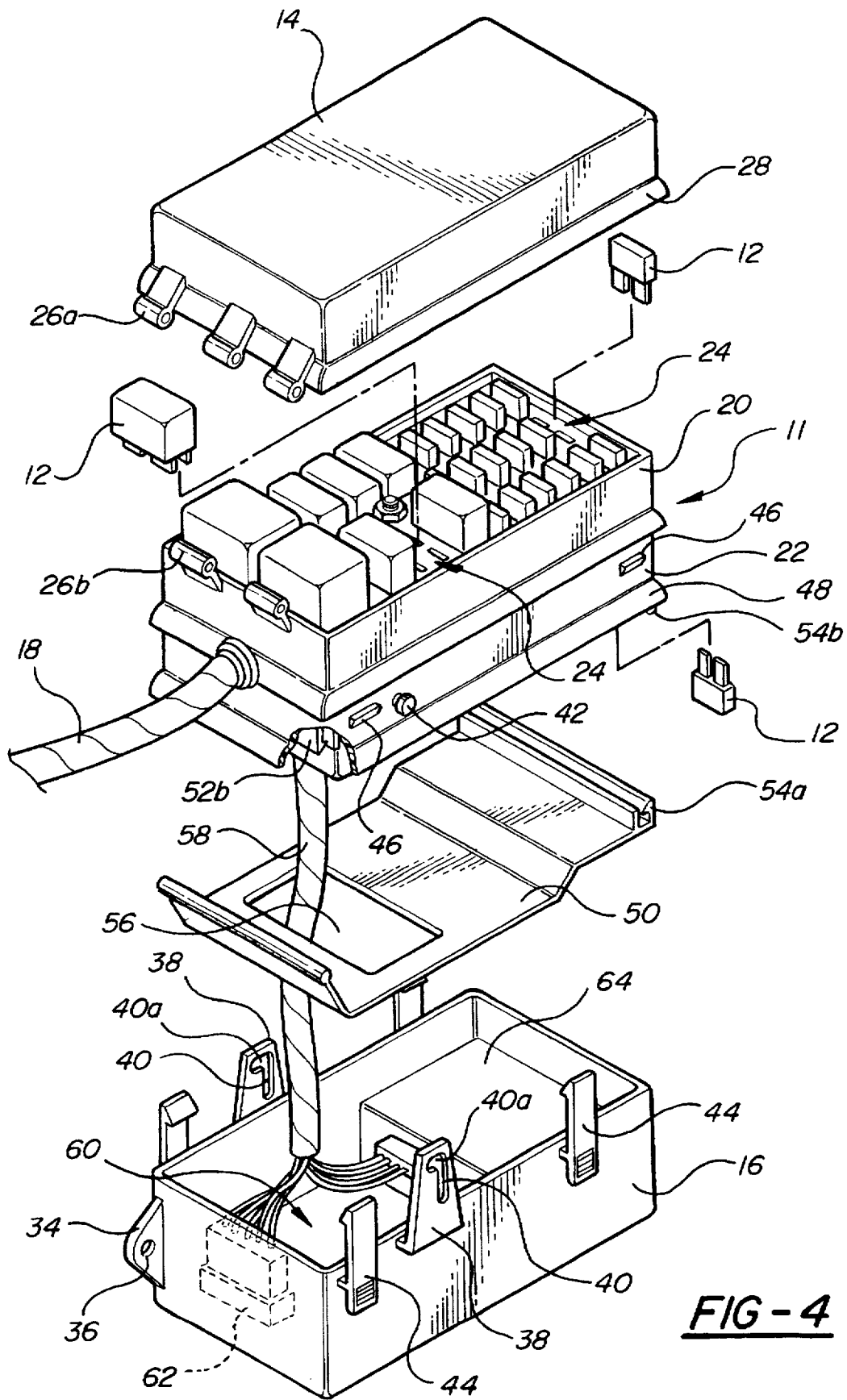
FIG. 4 is an exploded view of the invention PDB and housing assembly.

Referring to FIG. 1, the power distribution box and housing assembly 10 of the present invention comprises a power distribution box (PDB) 11 having a plurality of electrical components 12 mounted to upper and lower surfaces thereof, an upper housing 14 hingedly attached to the PDB adjacent the upper surface, and a lower housing 16 hingedly attached to the PDB adjacent the lower surface. The assembly 10 is adapted for operative installation in an automotive vehicle engine compartment 17, as shown in FIG. 2, such that lower housing 16 is fixed within the engine compartment. When so installed, upper housing 14 is movable between an open position and a closed position with respect to PDB 11 to alternatively expose and enclose the electrical components mounted to the PDB upper surface, and PDB 11 is movable between an open position and a closed position with respect to lower housing 16 to alternatively expose and enclose electrical components 12 mounted on the lower surfaces of the PDB. A wiring harness 18 extends from one end of PDB 11 to electrically connect the PDB to electrical systems throughout the vehicle.

PDB 11 comprises upper and lower PDB case halves 20, 22 which are fastened to one another in back-to-back fashion by bolts and/or integrally formed latches as is well known in the PDB art. The outwardly facing surfaces of upper and lower case halves 20, 22 have receptacles 24 formed thereon, the receptacles adapted to receive and retain electrical components 12 such as fuses, relays, and circuit breakers. The various electrical components 12 plug into their respective receptacles 24 to make electrical connection with bus bars or other circuit means (not shown) inside of PDB 11. Upper and lower PDB case halves 20, 22 are formed from a dielectric material such as thermoplastic, and are preferably injection molded.

Upper housing 14 is preferably injection molded plastic and is connected with upper PDB case half 20 by first hinge means 26a and second hinge means 26b respectively disposed on the two parts for coupling by a hinge pin (not shown). A flared skirt 28 is formed around the lower edge of upper housing 14, the skirt fitting down over the periphery of upper PDB case half 20 when the housing is in the closed position to provide an effective seal against the penetration of solid or liquid contaminants. A latch arm 30 is disposed on the end wall of upper housing 14 opposite first hinge means 26a and extends downwardly therefrom to engage a horizontally oriented latch ridge 32 on the end wall of upper PDB case half 20 when the housing is in the closed position with respect to the PDB. The latch arm 30 and latch ridge 32 engage one another to secure upper housing 14 in the closed position during normal use, and are manually unlatchable from one another by pulling or prying outwardly on latch arm 30 when it is desired to open the housing for inspection or maintenance of electrical components 12.

Lower housing 16 includes mounting flanges 34 for securing the entire PDB/housing assembly 10 to a panel or other structure within the engine compartment. In the embodiment shown, mounting flanges 34 have holes 36 formed therein to allow lower housing 16 to be bolted in place, but any means of securing the lower housing may be used without departing from the scope of the invention.

Lower housing 16 has a pair of hinge plates 38 extending upwardly from opposite side walls thereof to lie parallel with the sides of PDB 11. Each hinge plate 38 has a slot 40 formed therein comprising an elongated, substantially vertical portion and a short horizontal portion 40a of greater width than the vertical portion. Posts 42 project perpendicularly outward from opposite side walls of lower PDB case half 22, the posts engaging the slots in respective hinge plates 38 so as to permit PDB 11 to slide vertically and rotate with respect to the lower housing. Posts 42 have heads of diameter greater than the width of the vertical portions of slots 40 to retain the posts in engagement with the slots. Slot horizontal portions 40a are sufficiently wide to allow the heads of posts 42 to pass therethrough in order to attach and detach PDB 11 from lower housing 16.

A pair of clip arms 44 are disposed on either side wall of lower housing 16 and have hook-like upper ends which are releasably engagable with clip fasteners 46 appropriately positioned on the side walls of lower PDB case half 22. Clip arms 44 are snapped into engagement with clip fasteners 46 to secure PDB 11 in the closed position with respect to lower housing 16, and are disengaged to permit the PDB to be raised and rotated to its open position.

An outwardly flared skirt 48 extends downwardly from the lower edge of lower PDB case half 22 to fit over and around the upper edge of lower housing 16 when PDB 11 is seated on top of the lower housing in the closed position.

A retainer plate 50 is attached to lower PDB case half 22 by cooperating first and second hinge means 52a, 52b located at the edges of the plate and the lower case half respectively, and is securable in a position generally parallel with the underside of the lower case half by mating snap-type first and second latch means 54a, 54b located at the opposite edge of the plate and lower case respectively. Retainer plate 50 is contoured to closely overlay electrical components 12 when first and second latch means 54a, 54b are fastened to one another, thereby securing the components in connection with their respective receptacles and restraining them against the tendency to fall out of connection under the force of gravity. A window 56 is formed in retainer plate 50 to allow passage therethrough of a wire harness branch 58 which extends from PDB 11 downward into lower housing 16.

In the preferred embodiment of the invention, lower housing 16 is of sufficient depth that when PDB 11 is seated on the lower housing a compartment 60 is defined within the lower housing beneath retainer plate 50. Additional components related to vehicle electrical systems, such as a junction connector 62 and a module 64, are located in compartment 60 and so are protected from contamination when PDB 11 is in the closed position. Wire harness branch 58 is electrically connected with junction connector 62 and module 64.

Although the depicted embodiment of the power distribution box and housing assembly is generally rectangular when viewed in plan, an assembly according to the present invention may be of any shape necessary to accommodate the required electrical components and fit into an allotted space within the engine compartment.

To assemble the PDB and housing, retainer plate 50 is first attached to PDB 11 by snapping first and second hinge means 52a, 52b into engagement with one another. Wire harness branch 58 is then passed through window 56 in retainer plate 50, and the retainer plate is rotated about the hinge to overlay electrical components 12 first and second and latch means 54a, 54b are engaged with one another. Next, PDB 11 is placed between hinge plates 38 and the hinge plates are spread apart slightly to allow posts 42 to be inserted through the slot horizontal portions 40a. Wire harness branch 58 is then connected with junction connector 62 and module 64, and PDB 11 and lower housing 16 are moved toward each other until skirt 48 overlaps the upper edge of the lower housing. Clip arms 44 are engaged with respective clip fasteners 46 to secure PDB 11 in connection with lower housing 16. Finally, upper housing 14 is attached to the assembly by operatively joining hinge means 26a with 26b, and the upper housing is secured in the closed position by snapping latch arm 30 over latch ridge 32.

Figure 5:
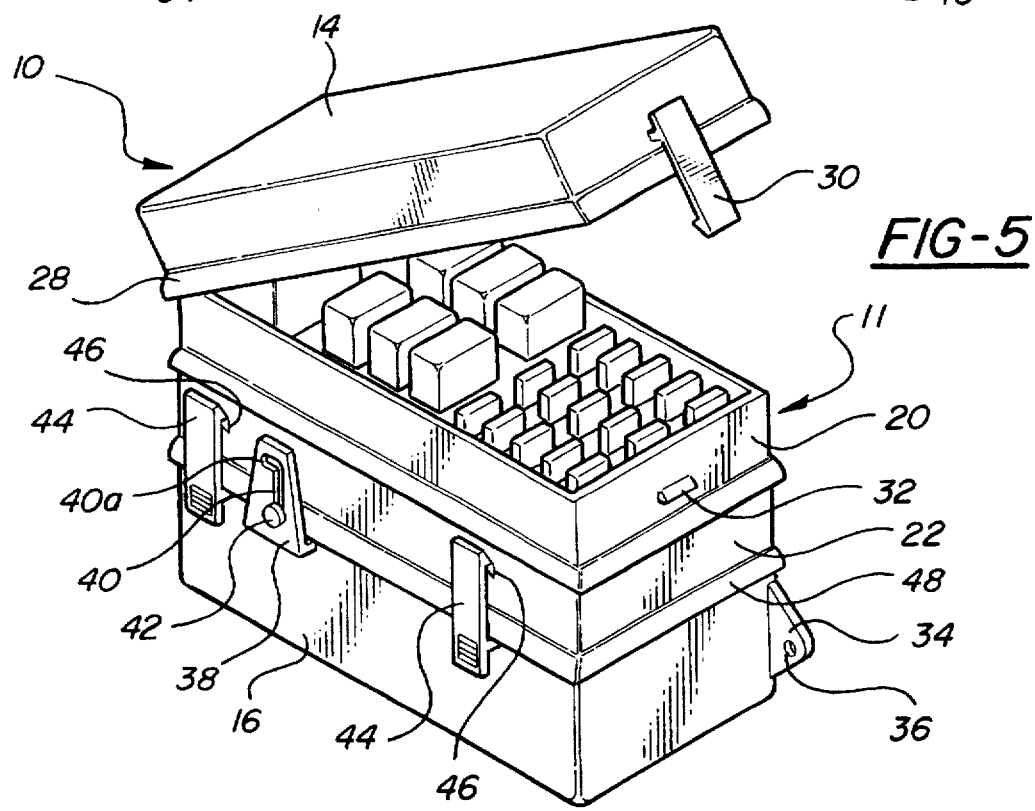
FIG. 5 is a perspective view of the invention PDB and housing assembly with an upper housing partially opened.

To access electrical components 12 mounted on the upper surface of PDB 11, latch arm 30 is released from latch ridge 32 and upper housing 14 is rotated to the open position as shown in FIGS. 1, 2 and 5. To gain access to electrical components 12 mounted on the lower surface of PDB 11 and within compartment 60, clip arms 44 are released from engagement with clip fasteners 46 and the PDB is lifted away from lower housing 16, posts 42 sliding upwardly in slots 40 until reaching the uppermost ends of the slots. PDB 11 is then shifted horizontally to move the posts into slot horizontal portions 40a, and the PDB is rotated about posts 42 to an open position as shown in FIGS. 1 and 2, exposing junction connector 62 and module 64 in compartment 60. Retainer plate 50 is then unlatched and swung downwardly to uncover electrical components 12 on the PDB lower surface, as shown in FIG. 1.

The overlapping of skirts 28, 48 with the sidewalls of PDB 11 and lower housing 16 respectively serves to provide an effective seal against the penetration of solid or liquid contaminants. Gaskets may also be provided around the interior of skirts 28, 48 to increase the effectiveness of the seals.

The resulting PDB and housing assembly 10 provides a substantially contamination-proof PDB which is smaller in both width and length than conventional PDBs capable of mounting a similar number of electrical components, yet still provides convenient access to all of these components when mounted in the crowded confines of an engine compartment.

Whereas a preferred embodiment of the invention has been illustrated and described in detail, it will be apparent that various changes may be made in the disclosed embodiment without departing from the scope or spirit of the invention.

It will be appreciated that the drawings and descriptions contained herein are merely meant to illustrate a particular embodiment of the present invention and are not meant to be limitations upon the practice thereof, as numerous variations will occur to persons of skill in the art. For example, although the invention is described above in relation to a PDB mounted horizontally in an engine compartment, it is to be understood that the invention may also be practiced in relation to the mounting of a PDB in any position and in any location where volume constraints and/or access restrictions make the use of a movably mounted PDB beneficial.

What is claimed is:

1. A power distribution box and housing assembly for mounting within an engine compartment, the assembly comprising:
    a power distribution box having an upper surface and an opposite lower surface, the upper and lower surfaces both having means for receiving electrical components;
    an upper housing attachable to the power distribution box to restrict access to the power distribution box upper surface;
    a lower housing having means for fixedly mounting the lower housing within the engine compartment; and
    hinge means connecting the lower housing with the power distribution box, the power distribution box pivotable about the hinge means between a closed position wherein the lower surface of the power distribution box is enclosed by the lower housing and an open position wherein the lower surface of the power distribution box is not enclosed by the lower housing.

2. A power distribution box and housing assembly according to claim 1 wherein the upper housing is attached to the power distribution box by second hinge means and is movable about the second hinge means between a first position wherein the upper housing restricts access to the upper surface of the power distribution box and a second position wherein the upper housing permits access to the upper surface of the power distribution box.

3. A power distribution box and housing assembly according to claim 1 further comprising:
    a retainer plate attached to the power distribution box adjacent the lower surface thereof to secure electrical components in connection with the lower surface of the power distribution box.

4. A power distribution box and housing assembly according to claim 3 wherein the retainer plate is hingedly attached to the power distribution box and is movable between a first position wherein the retainer plate overlays the electrical components connected to the lower surface and a second position wherein the retainer plate does not overlay the electrical components.

5. A power distribution box and housing assembly according to claim 1 wherein a compartment is defined within the lower housing below the lower surface of the power distribution box, the compartment being of adequate size and shape to contain additional electrical components electrically connected with the power distribution box, and the compartment being enclosed when the power distribution box is in the closed position and accessible when the power distribution box is in the open position.

6. A power distribution box and housing assembly according to claim 1 wherein the hinge means comprises:
    first and second hinge plates projecting from the lower housing, each hinge plate having an elongated slot therein; and
    first and second hinge posts projecting from the power distribution box and into engagement with respective slots to permit both rotating and sliding movement of the power distribution box with respect to the lower housing.

7. A housing assembly for movably mounting a power distribution box within a vehicle engine compartment, the power distribution box having an upper surface and an opposite lower surface, the upper and lower surfaces both having means for receiving electrical components, the housing assembly comprising:
    a lower housing fixedly mountable within the engine compartment;
    hinge means for connecting the lower housing with the power distribution box and permitting movement of the power distribution box between a first position wherein the lower housing restricts access to the lower surface of the power distribution box and a second position wherein the lower housing permits access to the lower surface of the power distribution box; and
    a retainer plate hingedly attachable to the power distribution box adjacent the lower surface thereof to secure electrical components in connection with the lower surface of the power distribution box and movable relative to the power distribution box between a first position wherein the retainer plate overlays the electrical components connected to the lower surface and a second position wherein the retainer plate does not overlay the electrical components.

8. The housing assembly according to claim 7 further comprising:
    an upper housing attachable to the power distribution box by second hinge means and movable about the second hinge means between a first position wherein the upper housing restricts access to the upper surface of the power distribution box and a second position wherein the upper housing permits access to the upper surface of the power distribution box.

9. The housing assembly according to claim 7 wherein a compartment is defined within the lower housing below the lower surface of the power distribution box, the compartment being of adequate size and shape to contain additional electrical components electrically connected with the power distribution box, and the compartment being enclosed when the power distribution box is in the first position and accessible when the power distribution box is in the second position.

10. The housing assembly according to claim 7 wherein the hinge means comprises:
    first and second hinge plates projecting from the lower housing, each hinge plate having an elongated slot therein for engagement with a hinge post projecting from the power distribution box to permit both rotating and sliding movement of the power distribution box with respect to the lower housing.

* * * * *